US012078558B1

(12) United States Patent
Dunbar

(10) Patent No.: US 12,078,558 B1
(45) Date of Patent: Sep. 3, 2024

(54) MECHANICALLY ATTACHED STRAIN DEVICE

(71) Applicant: Halliburton Energy Services, Inc., Houston, TX (US)

(72) Inventor: Bradley David Dunbar, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/220,141

(22) Filed: Jul. 10, 2023

(51) Int. Cl.
*G01L 1/22* (2006.01)
*E21B 47/013* (2012.01)

(52) U.S. Cl.
CPC .......... *G01L 1/2231* (2013.01); *E21B 47/013* (2020.05)

(58) Field of Classification Search
CPC ............................ E21B 47/013; G01L 1/2231
See application file for complete search history.

(56) References Cited

U.S. PATENT DOCUMENTS 7,234,362 B2* 6/2007 Shinn, II ................ G01N 33/24 73/784
11,162,350 B2 11/2021 Dunbar
11,536,133 B2 12/2022 Sugiura et al.
2005/0230149 A1* 10/2005 Boucher ................ E21B 47/01 175/48
2006/0107772 A1* 5/2006 Shinn, II ................ G01N 33/24 73/864.43
2019/0242238 A1* 8/2019 Yao ...................... E21B 47/013
2021/0131263 A1* 5/2021 Dunbar .................. E21B 10/43
2021/0131264 A1* 5/2021 Dunbar .................. E21B 47/01
2021/0148216 A1* 5/2021 Labahn ................ E21B 47/007
2022/0010637 A1* 1/2022 Dunbar .................. E21B 47/06
2023/0137825 A1* 5/2023 Dunbar .................. E21B 10/26 175/24
2024/0151598 A1* 5/2024 Froggatt .............. G01L 1/2237

* cited by examiner

*Primary Examiner* — Shane Bomar
(74) *Attorney, Agent, or Firm* — Michael Jenney; C. Tumey Law Group PLLC

(57) ABSTRACT

A system may include a strain gauge bar securable within a puck recess formed in an outer surface of a downhole drill bit. The strain gauge bar may be configured to collect data indicating a downhole force applied to the downhole drill bit during drilling operations. Further, the strain gauge bar may have a body portion and at least one wedge feature protruding from the body portion. The at least one wedge feature may be insertable into at least one wedge recess formed in the bottom surface of the puck recess. The system may also include a strain puck cap securable within the puck recess. The strain puck cap may be configured to apply pressure to the strain gauge bar to drive the at least one wedge feature of the strain gauge bar into the at least one wedge recess and pre-load the strain gauge bar.

20 Claims, 8 Drawing Sheets

218 208 210 410 408 406 430 304 400 434 212 428 402 418 426 416 414 412 404 432 432 436 420 426 422 114

MECHANICALLY ATTACHED STRAIN DEVICE

BACKGROUND

Downhole drill bits are used to form wellbores in subterranean formations for recovering hydrocarbons such as oil and gas lying beneath the surface. Examples of such downhole drill bits include rotary drill bits (e.g., fixed cutter drill bits, roller cone bits, hybrid bits, etc.), hole openers, reamers, and coring bits. Generally, downhole drill bits are mounted on the ends of drill strings, which may be several miles long. At the surface of the wellbore, a rotary table or top drive may turn the drill string, which rotates the downhole drill bit to penetrate the subterranean formation. Additionally, during drilling operations, drilling strings generally apply weight on bit (WOB) to drive the downhole drill bits to penetrate the subterranean formations. As such, contact between downhole drill bits and the subterranean formations apply various forces (e.g., compression and bending forces) on downhole drill bits. Such forces may wear or fatigue the downhole drill bit and/or cutting elements secured to the downhole drill bit. Sensors may be used to collect and transmit data indicating forces on the downhole drill bits, which may be analyzed and used to limit the amount of forces applied to the downhole drill bit.

BRIEF DESCRIPTION OF THE DRAWINGS

These drawings illustrate certain aspects of some of the embodiments of the present disclosure and should not be used to limit or define the method.

DETAILED DESCRIPTION

Disclosed herein are systems and methods for collecting and transmitting data indicating downhole forces applied to a downhole drilling tool. In particular, disclosed herein is a strain puck system that includes one or more strain pucks that may be mechanically attached to and detached from the downhole drilling tool in a manner such that the strain pucks may be quickly and easily replaced during drilling operations. Further, each puck assembly includes at least one strain gauge bar secured within a puck recess formed in the downhole drilling tool. The strain gauge bar includes at least one wedge feature configured to be press-fit into a portion of the puck recess by a strain puck cap of the strain puck such that the strain gauge bar may be preloaded in the puck recess. Preloading the strain gauge bar may permit the strain gauge bar to consistently and accurately measure both tension and compression for the downhole drill bit. As set forth in greater detail below, these measurements may be analyzed and used to limit the amount of forces applied to the downhole drill bit, which may improve drilling operations.

Figure 1:
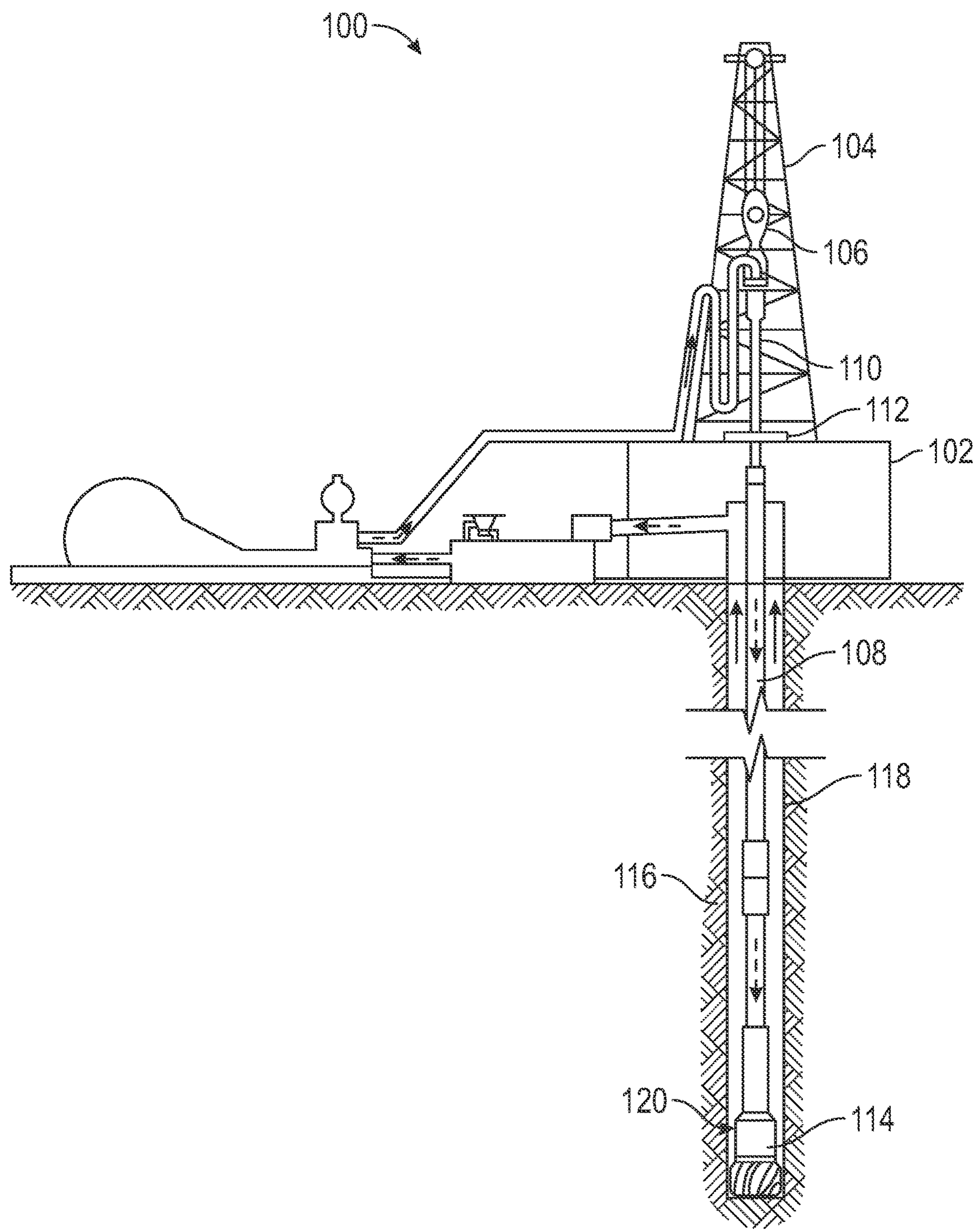
FIG. 1 illustrates an elevation view of a well system, in accordance with some embodiments of the present disclosure.

FIG. 1 illustrates an elevation view of a well system, in accordance with some embodiments of the present disclosure. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure. As illustrated, the drilling assembly 100 may include a drilling platform 102 that supports a derrick 104 having a traveling block 106 for raising and lowering a drill string 108. The drill string 108 may include, but is not limited to, drill pipe, as generally known to those skilled in the art. A kelly 110 may lowered through a rotary table 112 and can be used to transmit rotary motion from the rotary table to the drill string 108. A downhole drilling tool 120 (e.g., a downhole drill bit 114, a hole opener, a reamer, etc.) may be attached to the distal end of the drill string 108 and can be driven by a downhole motor and/or via rotation of the drill string 108. As the downhole drilling tool rotates, it penetrates various subterranean formations 116 to create a wellbore 118.

Figure 2:
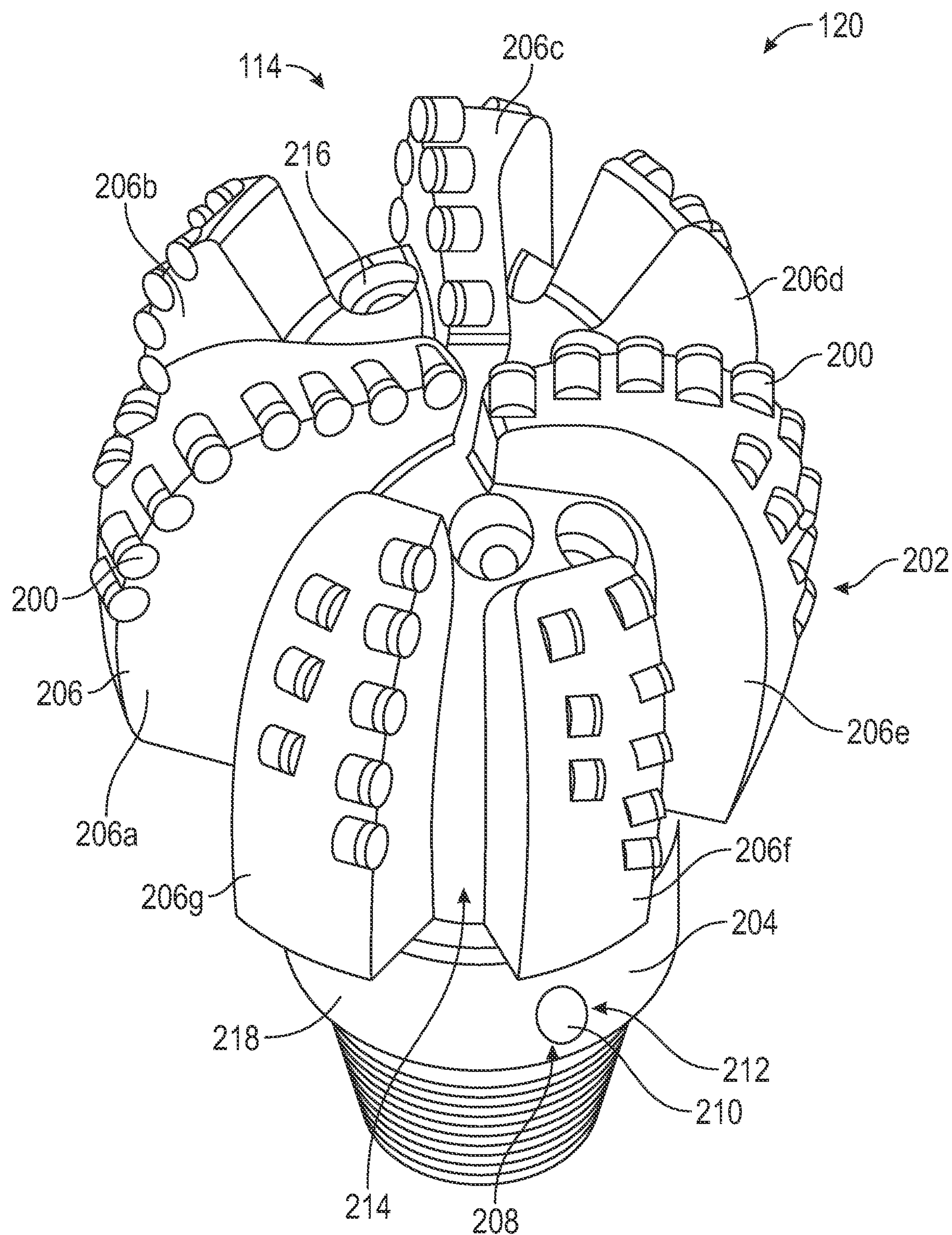
FIG. 2 illustrates a perspective view of a downhole drilling tool, in accordance with some embodiments of the present disclosure.

FIG. 2 illustrates a perspective view of a downhole drilling tool, in accordance with some embodiments of the present disclosure. As illustrated, the downhole drilling tool 120 may be a drill bit 114 (e.g., fixed cutter drill bit) having a plurality of cutting elements 200 at fixed locations on a bit body 202 of the drill bit 114. However, the downhole drilling tool 120 may be any suitable downhole drilling tool 120 (e.g., roller cone bit, hybrid drill bit, hole openers, reamers, coring bits, etc.). As illustrated, the drill bit 114 may include a bit body 202 and a shank 204 coupled to the bit body 202. Further, the drill bit 114 may include one or more blades 206 (e.g., blades 206*a*-206*g*) extending outwardly from the bit body 202 and one or more cutting elements 200 secured to the blades 206. As the drill bit 114 rotates, the cutting elements 200 may shear and/or break the subterranean formation 116 to form the wellbore 118 (shown in FIG. 1).

The downhole drill bit 114 may also include a strain puck system 208 having at least one strain puck 210 that may be removably coupled to the downhole drill bit 114. That is, the strain puck 210 may be mechanically attached to and detached from the downhole drill bit 114. As illustrated, the downhole drill bit 114 may include at least one puck recess 212 configured to receive the at least one strain puck 210. The puck recess 212 may be formed in the shank 204 of the drill bit 114. Alternatively, the puck recess 212 may be formed in the bit body 202 or any of suitable portion of the downhole drill bit 114 (e.g., junk slots 214, fluid flow paths 216, blades 206, etc.). The puck recess 212 may be defined by a substantially cylindrical bore formed in an outer surface 218 of the downhole drill bit 114. However, the puck recess 212 may have any suitable shape. For example, the puck recess 212 may be rectangular prism shaped, cube shaped, etc.

Moreover, with the strain puck 210 removably coupled to the drill bit 114, downhole forces applied to the drill bit 114 may be similarly applied to the strain puck 210. As set forth in greater detail below, the strain puck 210 may include strain gauges secured to respective strain gauge bars (shown in FIG. 4). The strain gauges are configured to collect and transmit data indicating forces on the strain puck 210, which are indicative of downhole forces on the drill bit 114. Further, the strain gauges may include transmitters for transmitting the collected data to one or more receivers such that the data from each strain gauge may be analyzed in real-time or post drilling operations to determine tension, compression, torque, and/or other downhole forces acting on the downhole drill bit 114.

Figure 3:
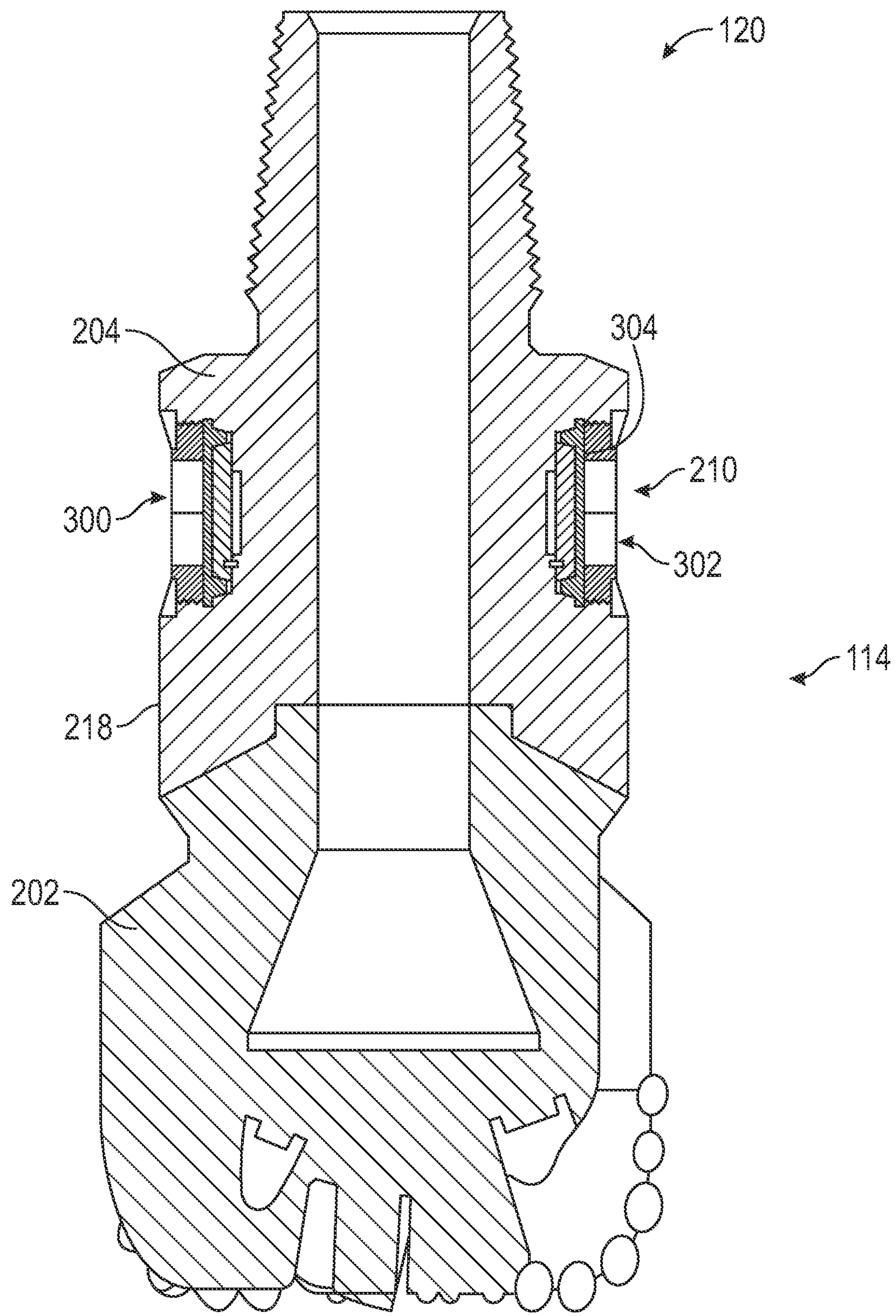
FIG. 3 illustrates a cross-sectional view of downhole drill bit having a plurality of strain pucks, in accordance with some embodiments of the present disclosure.

FIG. 3 illustrates a cross-sectional view of a downhole drill bit having a plurality of strain pucks, in accordance with some embodiments of the present disclosure. As illustrated, the downhole drill bit 114 may include two strain pucks 210 (e.g., a first strain puck 300 and a second strain puck 302) removably coupled to the outer surface 218 of the downhole drill bit 114. In particular, the strain pucks 210 may be secured to the shank 204 of the drill bit 114. Further, as set forth above, each strain puck 210 may include at least one strain gauge bar 304 having a respective strain gauge (shown in FIG. 4). As set forth above, the respective strain gauges may collect data indicating downhole forces applied to downhole drill bit 114 during a drilling process. In the illustrated embodiment, the strain gauges of the first strain puck 300 and the second strain puck 302 may collect data indicating downhole forces applied to shank 204 of downhole drill bit 114, as the first strain puck 300 and the second strain puck 302 are removably coupled to the shank 204 and downhole forces applied to the shank 204 may similarly be applied to each strain puck 300, 302, which may be measured by their respective strain gauges.

Further, as set forth above, each strain gauge may transmit data indicating downhole forces to one or more receivers such that the data from each strain gauge may be analyzed. Specifically, strain gauges on each strain puck 210 may collect data indicating compression forces, bending forces, and torsional forces applied to each strain puck 210 during a drilling operation and may transmit the collected data in real-time. This data may be received by a receiver for real-time analysis or stored in a memory medium within downhole drill bit 114 for analysis at a later time.

Analysis of data received from strain gauges may suggest ways in which one or more downhole drilling parameters may be modified to reduce the magnitude of the downhole forces applied to downhole drill bit 114. Examples of the downhole drilling parameters may include rotational speed of the downhole drill bit 114 in revolutions per minute (RPM), a rate of penetration (ROP), a weight on bit (WOB), a torque on bit (TOB), and a depth-of-cut control (DOCC). The rate of penetration (ROP) of downhole drill bit 114 may be a function of both weight on bit (WOB) and revolutions per minute (RPM). As set forth above, drill string 108 may apply weight on downhole drill bit 114 and may also rotate downhole drill bit 114 to form wellbore the 118 (shown in FIG. 1). The depth-of-cut per revolution may also be based on ROP and RPM of a particular bit and indicates how deeply drill bit cutting elements 200 (shown in FIG. 2) are engaging the subterranean formation 116. An analysis of the data received from strain gauges may indicate what downhole drilling parameters may be causing or contributing to compression forces, bending forces, and/or torsional forces applied to the downhole drill bit 114 during the drilling process.

As illustrated, the first strain puck 300 and the second strain puck 302 may be disposed approximately 180 degrees from one another, such that data received from the respective strain gauges disposed on each strain puck 210 may be used simultaneously for analysis to determine downhole forces being applied to both sides of the shank 204 (e.g., compression, bending, etc.). Further, data indicating compression forces applied to both strain pucks 300, 302 may be analyzed to calculate the weight on bit (WOB) based on a compression value from the first strain puck 300 and a compression value from the second strain puck 302. Additionally, a bending value may be calculated based on a compression value from the first strain puck 300 and a tension value (e.g., indicating a tensile force) from the second strain puck 302. Further, a torque on bit (TOB) value may be calculated based on torsion value (e.g., indicating a torsional force) applied to both strain pucks 300, 302. Although only two strain pucks are shown, the downhole drill bit 114 may alternatively include three strain pucks 210, which may be disposed 120 degrees from one another, four strain pucks 210 disposed 90 degrees from one another, or any suitable number of strain pucks 210. Downhole drill bits 114 with multiple strain pucks 210 may use data received from the various strain gauges disposed on each of the strain pucks 210 simultaneously for analysis to determine downhole forces being applied to shank 204 and/or bit body 202. Such analysis may identify the direction of a bending force and/or to determine whether a torsional force is symmetric around shank 204 and/or bit body 202.

Values indicating WOB, bending, and TOB may be used to determine a set of optimized downhole drilling parameters in order to extend the lifetime of the downhole drilling tool and/or perform more efficient drilling operations. In particular, if WOB exceeds an adjustable threshold, compression forces applied to the downhole drilling tool 120 may damage the downhole drilling tool 120 or result in inefficient drilling operations. Accordingly, WOB may be modified such that WOB is within the adjustable threshold. Similarly, if a bending value exceeds an adjustable threshold, bending forces may damage the downhole drilling tool 120 or drill string 108 of the drilling assembly 100 (shown in FIG. 1). In response, drilling operations may be modified such that the bending value is within an adjustable threshold, thereby reducing the bending forces applied to the downhole drilling tool 120. Also, if the TOB exceeds an adjustable threshold, drilling operations may be modified such that the TOB value is within an adjustable TOB threshold, thereby reducing torsional forces applied to the downhole drilling tool 120. Additionally, if WOB, bending, and TOB values are determined to be within only a fraction (e.g., twenty-five percent) of each corresponding adjustable threshold, drilling operations (e.g., downhole drilling parameters) may be modified to increase compression forces (e.g., WOB), bending forces, and torsional forces (e.g., TOB) such that the modified downhole drilling parameters may result in more efficient drilling operations.

Figure 4:
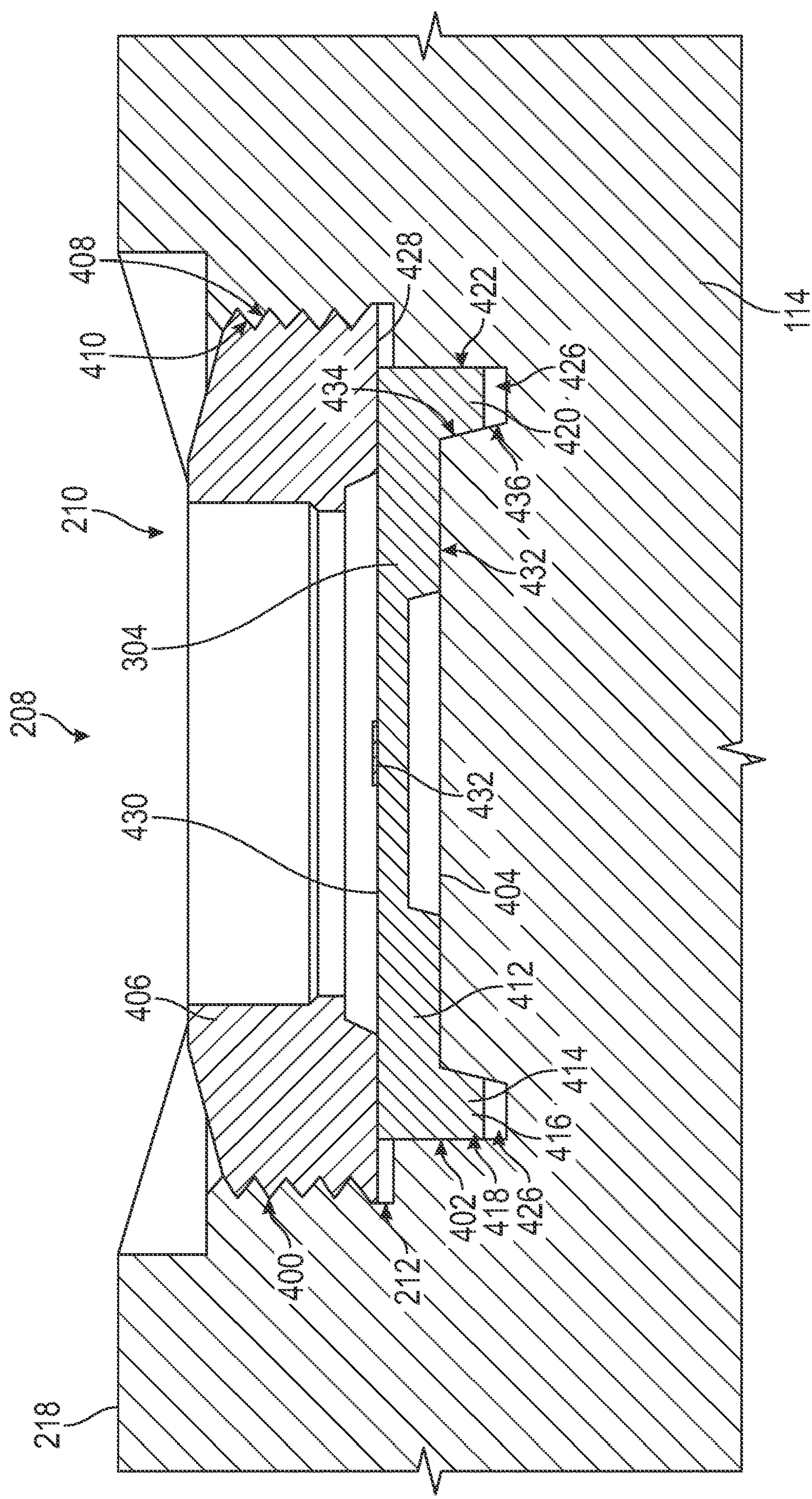
FIG. 4 illustrates a cross-sectional view of a strain puck system having a strain puck secured to a downhole drill bit, in accordance with some embodiments of the present disclosure.

FIG. 4 illustrates a cross-sectional view of a strain puck system having a strain puck secured to a downhole drill bit, in accordance with some embodiments of the present disclosure. The strain puck system 208 may include the strain puck 210, as well as the puck recess 212 formed in the downhole drill bit 114. As set forth above, the puck recess 212 may be defined by a substantially cylindrical bore formed in the outer surface 218 of the downhole drill bit 114. As illustrated, the puck recess 212 may have a variable diameter along the depth of the puck recess 212. That is, an upper portion 400 of the puck recess 212, disposed proximate the outer surface 218 of the downhole drill bit 114 may have a greater diameter and/or cross-sectional area than a lower portion 402 of the puck recess 212 that is disposed proximate a bottom surface 404 of the puck recess 212. Alternatively, the upper portion 400 and the lower portion 402 of the puck recess may have a uniform diameter and/or cross-sectional area. As set forth in greater detail below, the strain puck 210 may include a strain puck cap 406. The upper portion 400 of the puck recess 212 may be configured to receive the strain puck cap 406. Specifically, the upper portion 400 of the puck recess 212 may have a first threading 408, and the strain puck cap 406 may have a second threading 410 such that the strain puck cap 406 may be threaded into the upper portion 400 of the puck recess 212, which may secure the strain puck cap 406 in the puck recess 212. Also, due to the threaded interface, the strain puck cap 406 may be quickly detached from the downhole drill bit 114 between drilling operations by unthreading the strain puck cap 406 from the puck recess 212 should repairs or replacement be needed.

Moreover, the strain puck 210 may further include at least one strain gauge bar 304 that is securable within a puck recess 212. In particular, the strain gauge bar 304 may be at least partially secured within the lower portion 402 of the puck recess 212. The strain gauge bar 304 has a body portion 412 and at least one wedge feature 414 protruding from the body portion 412. As illustrated, the at least one wedge feature 414 includes a first wedge feature 416 disposed at a first end 418 of the strain gauge bar 304 and a second wedge feature 420 disposed at a second end 422 of the strain gauge bar 304. That is, the strain gauge bar 304 may have two wedge features 414 positioned at opposing ends of the body portion 412 of the strain gauge bar 304. As illustrated, each of the wedge features 414 may protrude out from a bottom portion 424 of the strain gauge bar 304. However, the wedge features 414 may protrude out from any suitable portion of the strain gauge bar 304.

Further, the at least one wedge feature 414 (e.g., the first wedge feature 416 and the second wedge feature 420) may be insertable into at least one corresponding wedge recess 426 formed in the bottom surface 404 of the puck recess 212. For example, during installation, the strain gauge bar 304 may be inserted into the puck recess 212 such that the first wedge feature 416 is inserted into a corresponding first wedge recess 438 and the second wedge feature 420 is inserted into a corresponding second wedge recess 440. Alternatively, the at least one wedge recess 426 may include a single wedge recess (shown in FIG. 9) extending about the circumference of the bottom surface 404 of the puck recess 212 such that the first wedge feature 416 may be inserted into a first portion of the single wedge recess and the second wedge feature 420 may be inserted into a second portion of the single wedge recess positioned on an opposite side of the puck recess with respect to the first portion of the single wedge recess.

The strain gauge bar 304 may be secured within the puck recess 212 via the strain puck cap 406. That is, the strain puck cap 406 may be disposed over the strain gauge bar 304 in the puck recess 212 to restrain the strain gauge bar 304 within the puck recess 212. Further, the strain puck cap 406 may be configured to apply pressure to the strain gauge bar 304 to drive the at least one wedge feature 414 of the strain gauge bar 304 into the at least one wedge recess 426 and pre-load the strain gauge bar 304. For example, the strain puck cap 406 may be threaded into the puck recess 212 and after a bottom cap surface 428 of the strain puck cap 406 contacts a top surface 430 of the strain gauge bar 304, the strain puck cap 406 may be further threaded into the puck recess 212 to move the strain puck cap 406 further into the puck recess 212, which also drives the at least one wedge feature 414 further into the at least one wedge recess 426 and pre-loads the strain gauge bar 304. As illustrated, having the first end 418 and second end 422 of the strain gauge bar 304 be driven into and held against opposing sides of the puck recess 212 may permit the forces applied to the downhole drill bit 114 to be transferred to the strain gauge bar 304, thereby allowing the strain gauge 432 on the strain gauge bar 304 to collect and transmit data indicating forces on the downhole drill bit 114. Further, preloading the at least one wedge feature 414 of the strain gauge bar 304 may permit the strain gauge bar 304 to consistently and accurately measure both tension and compression for the downhole drill bit 114. That is, preloading the strain gauge bar 304 may pre-strain the strain gauge bar 304 such that the strain gauge 432 secured to the strain gauge bar 304 may measure strain in both compression and tension. Without pre-straining the strain gauge bar 304, the strain gauge 432 may only measure either tension or compression.

Further, the at least one wedge feature 414 may comprise at least one angled wedge surface 434 configured to interface with a corresponding angled recess surface 436 of the at least one wedge recess 426. The angled wedge surface 434 may be configured to slide along the angled recess surface 436 as the at least one wedge feature 414 is driven into the at least one corresponding wedge recess 426 via the strain puck cap 406 being threaded or otherwise inserted into the puck recess 212. Having an angled interface between the angled wedge surface 434 and the angled recess surface 436 may permit the wedge feature 414 to be press-fit into the wedge recess 426 to further secure the strain gauge bar 304 within the puck recess 212. That is, the angled interface may help drive the first end 418 and second end 422 of the strain gauge bar 304 into opposing sides of the puck recess 212, which may secure the strain gauge bar 304 against the puck recess 212 such that forces on the downhole drill bit 114 may be transmitted effectively to the strain gauge bar 304.

Figure 5:
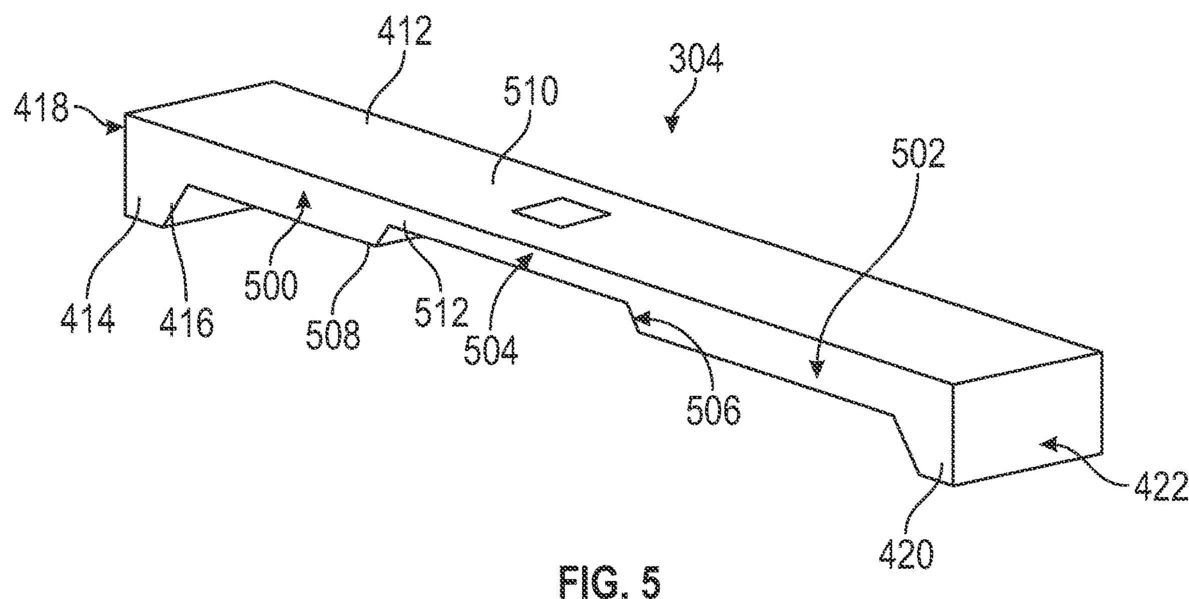
FIG. 5 illustrates a perspective view of a strain gauge bar of a strain puck, in accordance with some embodiments of the present disclosure.

FIG. 5 illustrates a perspective view of a strain gauge bar of a strain puck, in accordance with some embodiments of the present disclosure. As set forth above, the strain gauge bar 304 is securable within the puck recess 212 formed in the outer surface 218 of a downhole drill bit 114 (shown in FIG. 4). Further, the strain gauge bar 304 includes the body portion 412 and the at least one wedge feature 414 protruding from the body portion 412. The body portion 412 may have a rectangular prism shape. However, the body portion 412 may include any suitable shape. For example, the body portion 412 may alternatively have a cylindrical shape. As illustrated, the at least one wedge feature 414 may include the first wedge feature 416 disposed at the first end 418 of the strain gauge bar 304 and the second wedge feature 420 disposed at the second end 422 of the strain gauge bar 304.

Further, the body portion 412 may include a first end portion 500, a second end portion 502, and a middle portion 504 positioned between the first end portion 500 and the second end portion 502. The first end portion 500 may extend between the first end 418 of the strain gauge bar 304 and the middle portion 504. Similarly, the second end portion 502 may extend between the second end 422 of the strain gauge bar 304 and the middle portion 504. Moreover, the middle portion 504 may have a smaller cross-sectional area than the first end portion 500 and the second end portion 502. That is, the middle portion 504 may be thinner than the first end portion 500 and the second end portion 502. Reducing the cross-sectional area of the middle portion 504 of the strain gauge bar 304 may increase the sensitivity of the strain gauge bar 304, which may improve data collection for the forces on the downhole drill bit 114. Indeed, as set forth above, the strain gauge 432 secured to the strain gauge bar 304 is configured to collect data indicating forces applied to the downhole drill bit 114 during drilling operations.

Moreover, the strain gauge bar 304 may include a groove 506 formed in the middle portion 504 of the body portion 412. As illustrated, the groove 506 may extend through a bottom section 508 of the middle portion 504. Alternatively, the groove 506 may extend through a top section 510 of the middle portion 504, through a side section 512 of the middle portion 504, or some combination thereof. For example, the groove 506 may extend about the circumference of the middle portion 504 of the strain gauge bar 304. The groove 506 may reduce the cross-sectional area of the middle portion 504 of the body to magnify the measurements or readings of the strain gauge 432. Indeed, as set forth above, reducing the cross-sectional area of the middle portion 504 may increase the sensitivity of the strain gauge bar 304. Additionally, the groove 506 may provide a passage for an additional strain gauge bar to pass through a center of the puck recess 212 such that additional strain gauge bars 304 may be disposed in the puck recess 212 as shown in FIG. 7.

Figure 6:
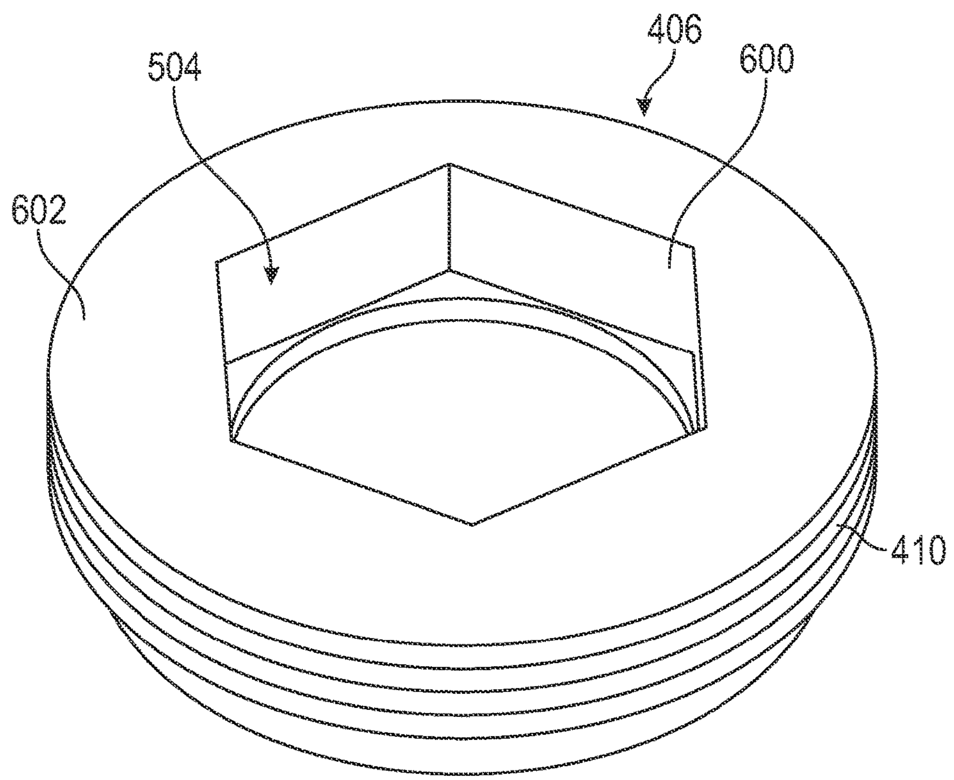
FIG. 6 illustrates a perspective view of a strain puck cap, in accordance with some embodiments of the present disclosure.

FIG. 6 illustrates a perspective view of a strain puck cap, in accordance with some embodiments of the present disclosure. As set forth above, the strain puck cap 406 may be securable with the puck recess 212 via the second threading 410 configured to interface with the corresponding first threading 408 of the puck recess 212 (shown in FIG. 4). Alternatively, the strain puck cap 406 may be press-fit within the puck recess 212 or secured within the puck recess 212 via an adhesive and/or locking mechanism (not shown). For example, the strain puck cap 406 may include spring-loaded pins configured to expand into corresponding spring pin recesses formed in the side surface of the puck recess to hold the strain puck cap 406 in the puck recess. In another example, the strain puck cap 406 may be secured within the puck recess via an adhesive in combination with the threaded interface. That is, the adhesive may increase an initial torque required to unthread the strain puck cap 406 from the puck recess such that the strain puck cap 406 may resist loosening during drill operations.

Moreover, as illustrated, the strain puck cap 406 may have a substantially cylindrical shape. However, the strain puck cap 406 may include any suitable shape corresponding to the shape of the puck recess 212. For example, for a puck recess 212 having a rectangular prism shape, the strain puck cap 406 may be rectangular prism shaped and be press fit or otherwise secured within the puck recess 212. Additionally, as illustrated, the strain puck cap 406 may include a hollow middle portion 504, which may provide access to the at least one strain gauge bar 304 with the strain puck cap 406 installed (e.g., secured in the puck recess), as well as provide an interface surface 600 used for tightening and loosening the strain puck cap 406 in the puck recess 212. A filler cap (not shown) may be disposed within the hollow middle portion 504 during operation to isolate the at least one strain gauge bar 304 from the downhole environment. Alternatively, the strain puck cap 406 may include a solid center portion to isolate the strain gauge bars from the downhole environment (shown in FIG. 7). However, the solid portion may include a recess formed in an outer surface 602 of the strain puck cap 406 to provide the interface surface 600 used for tightening and loosening the strain puck cap 406 in the puck recess 212.

Figure 7:
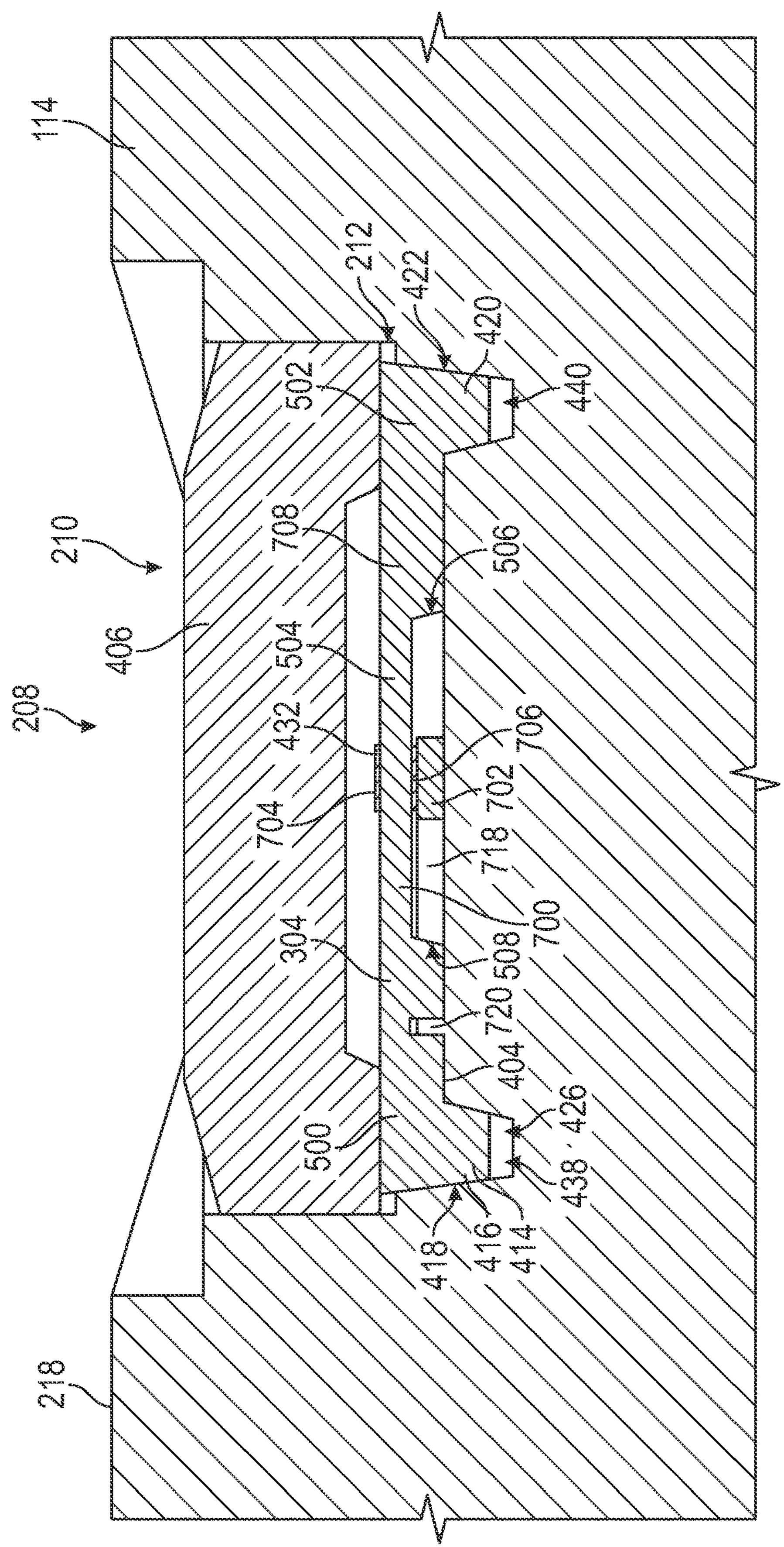
FIG. 7 illustrates a cross-sectional view of a strain puck system having a plurality of strain gauge bars, in accordance with some embodiments of the present disclosure.

FIG. 7 illustrates a cross-sectional view of a strain puck system having a plurality of strain gauge bars, in accordance with some embodiments of the present disclosure. As set forth above, the strain puck system 208 may include the strain puck 210, as well as the puck recess 212 formed in the downhole drill bit 114. Further, the strain puck 210 may include the strain puck cap 406 and the at least one strain gauge bar 304. As illustrated, the at least one strain gauge bar 304 may include a first strain gauge bar 700 and a second strain gauge bar 702, each having respective strain gauges 432 (e.g., a first strain gauge 704 and a second strain gauge 706). The first strain gauge bar 700 may have a first body portion 708 and at least one wedge feature 414 protruding from the first body portion 708. During drilling operations, the at least one wedge feature 414 may be disposed in at least one wedge recess 426 formed in the bottom surface 404 of the at least one puck recess 212. In particular, as illustrated, the at least one wedge feature 414 may include the first wedge feature 416 and the second wedge feature 420 disposed in the corresponding first wedge recess 438 and the second wedge recess 440, respectively, formed in the bottom surface 404 of the at least one puck recess 212. Additionally, the second strain gauge bar 702 may have a second body portion 718 and at least one wedge feature 414 protruding from the second body portion 718. During drilling operations, the at least one wedge feature 414 may be disposed in a corresponding wedge recess 426 formed in the bottom surface 404 of the at least one puck recess 212 (shown in FIG. 8).

Moreover, the first strain gauge bar 700 and the second strain gauge bar 702 may be secured within the at least one puck recess 212 formed in the outer surface 218 of the downhole drill bit 114 via the strain puck cap 406. As illustrated, the strain puck cap 406 may be press-fit within the puck recess 212 or otherwise secured via adhesives and/or a locking mechanism. Further, the strain puck 210 may be configured to apply pressure to the first strain gauge bar 700 and the second strain gauge bar 702 to drive the wedge features 416, 420 of the first strain gauge bar 700 and wedge features of the second strain gauge bar 702 into their corresponding wedge recesses and pre-load the first strain gauge bar 700 and the second strain gauge bar 702. Pre-loading the first strain gauge bar 700 and the second strain gauge bar 702 may permit the strain gauge bars 700, 702 to consistently and accurately measure both tension and compression for the downhole drill bit 114. Further, as illustrated, the first strain gauge bar 700 may be secured within the puck recess 212 in an orientation that is angularly offset from the second strain gauge bar 702 secured within the puck recess 212. Further, the strain puck system 208 may include alignment pins 720 to hold the strain gauge bars 700, 702 in their respective orientations. Angularly offsetting the strain gauge bars 700, 702 may allow the strain puck system 208 to collect and transmit additional data regarding the downhole forces applied to the downhole drill bit 114 during drilling operations.

Further, as illustrated, the first strain gauge bar 700 may include the first body portion 708 having the first end portion 500, the second end portion 502, and the middle portion 504 positioned between the first end portion 500 and the second end portion 502. The first end portion may extend between the first end 418 of the first strain gauge bar 700 and the middle portion 504. Similarly, the second end portion 502 may extend between a second end 422 of the first strain gauge bar 700 and the middle portion 504. Moreover, the middle portion 504 may have a smaller cross-sectional area than the first end portion 500 and the second end portion 502. That is, the middle portion 504 may be thinner than the first end portion 500 and the second end portion 502. Reducing the cross-sectional area of the middle portion 504 of the first strain gauge bar 700 may increase the sensitivity of the first strain gauge bar 700, which may improve data collection for the forces on the downhole drill bit 114. Indeed, as set forth above, the strain gauge 432 (e.g., the first strain gauge 704) secured to the strain gauge bar 304 (e.g., the first strain gauge bar 700) is configured to collect data indicating forces applied to the downhole drill bit 114 during drilling operations.

Moreover, the first strain gauge bar 700 may include the groove 506 formed in the middle portion 504 of the first body portion 708. As illustrated, the groove 506 may extend through the bottom section 508 of the middle portion 504. The groove 506 may reduce the cross-sectional area of the middle portion 504 of the body portion 412 to magnify the measurements or readings of the strain gauge 432, as set forth above. Additionally, the groove 506 may provide a passage for an additional strain gauge bar to pass through the center of the puck recess 212 such that additional strain gauge bars may be disposed in the puck recess 212. In particular, the groove 506 may provide a passage for the second strain gauge 706 to pass through the center of the puck recess 212 such that both the first strain gauge bar 700 and the second strain gauge bar 702 may be disposed within the puck recess 212 to collect and transmit data indicating forces applied to the downhole drill bit 114 during drilling operations.

Figure 8:
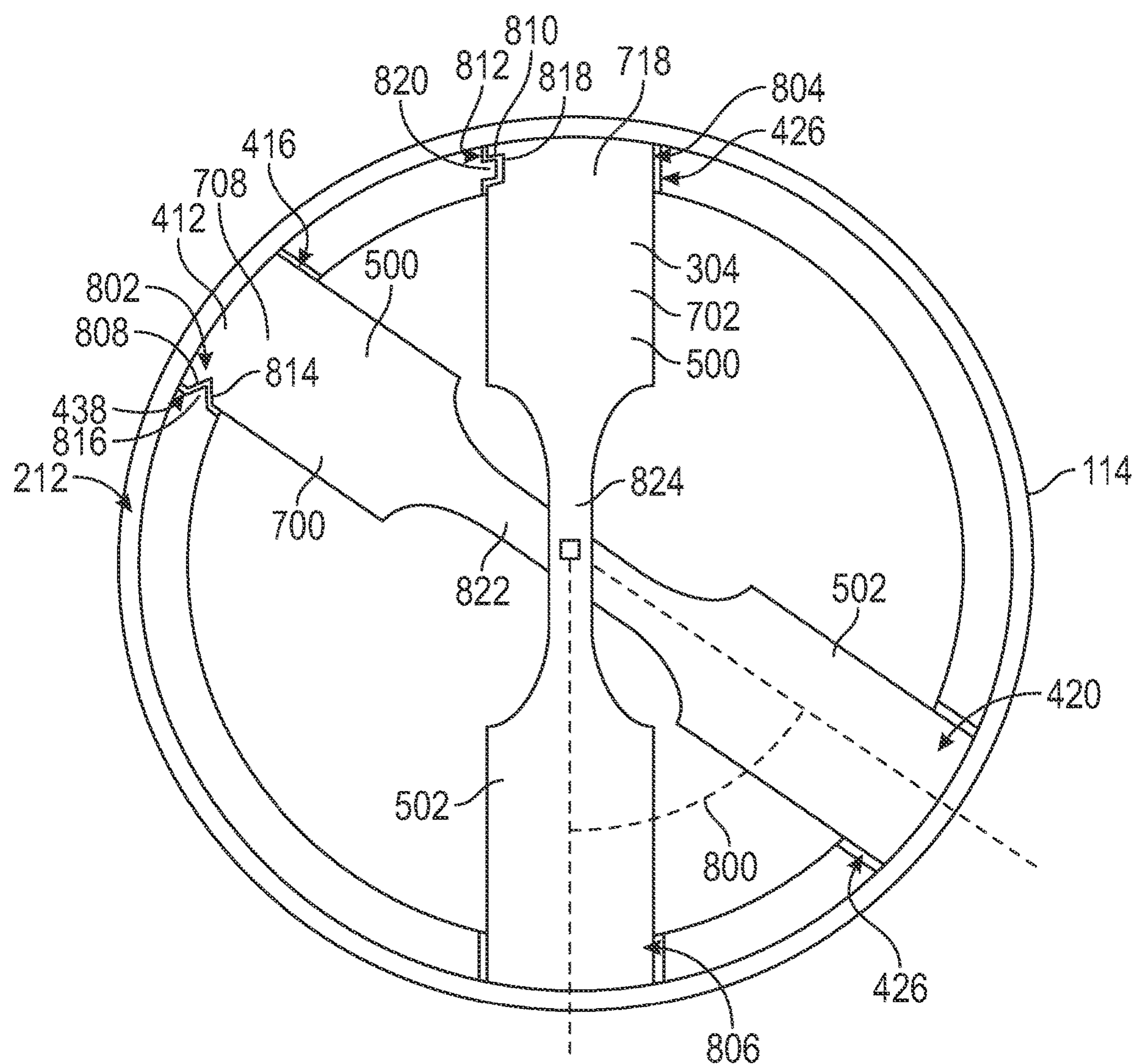
FIG. 8 illustrates a top view of a plurality of strain gauge bars secured in respective wedge recesses, in accordance with some embodiments of the present disclosure.

FIG. 8 illustrates a top view of a plurality of strain gauge bars secured in respective wedge recesses, in accordance with some embodiments of the present disclosure. As illustrated, the plurality of strain gauge bars 304 may include the first strain gauge bar 700 and the second strain gauge bar 702. As set forth above, the first strain gauge bar 700 may be angularly offset from the second strain gauge bar 702 in the puck recess 212 to collect and transmit additional data regarding the downhole forces applied to the downhole drill bit 114 during drilling operations. For example, the first strain gauge bar 700 may be angularly offset from the second strain gauge bar 702 by an angle 800 between thirty degrees and one-hundred and fifty degrees. Alternatively, the first strain gauge bar 700 may be angularly offset from the second strain gauge bar 702 by an angle between 60 degrees and one-hundred and 120 degrees. Additionally, or alternatively, the first strain gauge bar 700 may be axially offset from the second strain gauge bar 702.

Moreover, as illustrated, each strain gauge bar 304 may have a keyed geometry 802 such that each strain gauge bar 304 may only be secured within the puck recess 212 in a predetermined orientation. In particular, the at least one first wedge feature 416 and/or the second wedge feature 420 of the first strain gauge bar 700 and a third wedge feature 804 and/or a fourth wedge feature 806 of the second strain gauge bar 702 may each have keyed geometries 802 (e.g., a first keyed geometry 808 and a third keyed geometry 810) corresponding to the at least one first wedge recess 438 and a third wedge recess 812, respectively. Additionally, the keyed geometries 802 may extend into the respective body portions 708, 718 of the strain gauge bars 700, 702. The keyed geometries 802 may include various indentions and/or protrusions formed in the respective wedge features 414 and/or body portions 412 of the strain gauge bars 700, 702 that are configured to interface with corresponding protrusions and/or indentions formed in the respective wedge recess 426. For example, the first wedge feature 416 of the first strain gauge bar 700 may have a triangular shaped indention 814 corresponding to a triangular shaped protrusion 816 in the first wedge recess 438. Further, the third wedge feature 804 of the second strain gauge bar 702 may have a rhombus shaped indention 818 corresponding to a rhombus shaped protrusion 820 in the third wedge recess 812. As such, the first wedge feature 416 of the first strain gauge bar 700 may not be inserted into the third wedge recess 812 because the triangular shaped indention 814 of the first wedge feature 416 may interfere with the rhombus shaped protrusion 820. The first wedge feature 416 may only be inserted into the first wedge recess 438 with the corresponding triangular shaped protrusion 816 such that the first strain gauge bar 700 may only be secured in the puck recess 212 in the predetermined orientation corresponding to the first wedge feature 416 being disposed within the at least one first wedge recess 438.

Additionally, as illustrated, respective middle portions 504 (e.g., a first middle portion 822 and the second middle portion 824) of each strain gauge bar 700, 702 may have a smaller cross-sectional area than the respective first end portions 500 and the second end portions 502 of the strain gauge bars 700, 702. That is, the center portions 822, 824 may be thinner than the corresponding first end portions 500 and the second end portions 502. As illustrated, respective widths of each strain gauge bar 700, 702 may be reduced in the middle portions 822, 824. Additionally, or alternatively, respective heights of each strain gauge bar 700, 702 may be reduced. Reducing the cross-sectional area of the center portions 822, 824 of the strain gauge bars 700, 702 may increase the sensitivity of the strain gauge bars 700, 702, which may improve data collection for the forces on the downhole drill bit 114.

Figure 9:
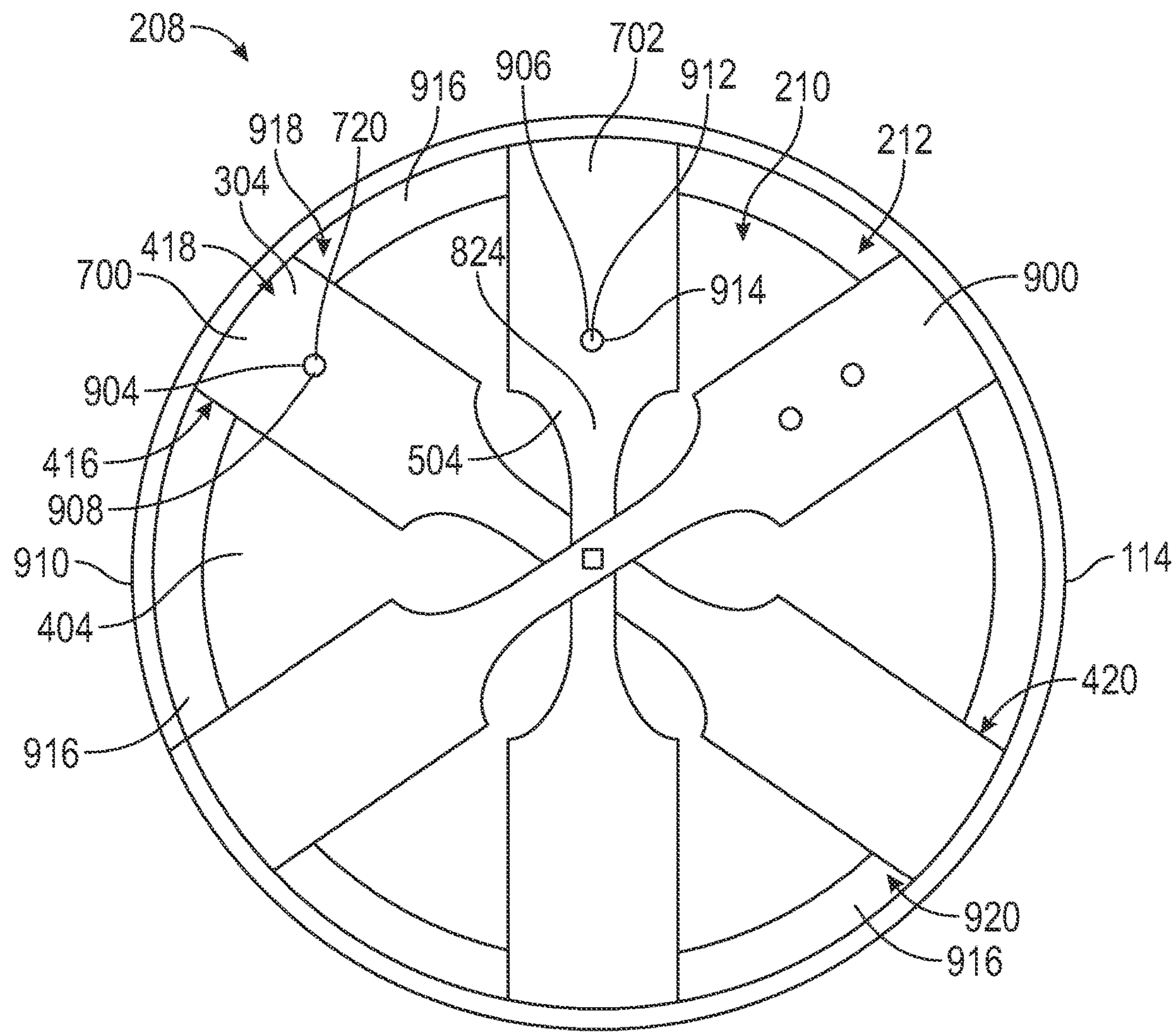
FIG. 9 illustrates a top view of a strain puck having alignment pins for aligning a plurality of strain gauge bars within a puck recess, in accordance with some embodiments of the present disclosure.

FIG. 9 illustrates a top view of a strain puck having alignment pins for aligning a plurality of strain gauge bars within a puck recess, in accordance with some embodiments of the present disclosure. As illustrated, the plurality of strain gauge bars 304 may include the first strain gauge bar 700, the second strain gauge bar 702, and a third strain gauge bar 900. Each strain puck 210 may include any suitable number of strain gauge bars 304 for collecting and transmitting additional and/or redundant data regarding the downhole forces applied to the downhole drill bit 114 during drilling operations.

As illustrated, the strain puck system 208 may include the alignment pins 720 configured to receive the first strain gauge bar 700, the second strain gauge bar 702, and the third strain gauge bar 900 at pre-determined orientations in the puck recess 212. That is, each strain gauge bar 700, 702, 900 may have respective alignment pin slots 902 that correspond with at least one alignment pin 720 disposed within the puck recess 212, such that each strain gauge bar 304 may only be secured within the puck recess 212 in a predetermined orientation. For example, the first strain gauge bar 700 may include a pin slot 914 (e.g., a first pin slot 904) disposed proximate the first end 418 of the first strain gauge bar 700 and the second strain gauge bar 702 may include a second pin slot 906 disposed proximate the middle portion 504 (e.g., the second middle portion 824) of the second strain gauge bar 702. Further, the strain puck system 208 may include a first alignment pin 908 extending up from the bottom surface 404 of the puck recess 212 proximate a side surface 910 of the of the puck recess 212 and a second alignment pin 912 extending up from the bottom surface 404 of the puck recess 212 proximate the center of the puck recess 212. As such, the first strain gauge bar 700 may not be inserted into the puck recess 212 over the second alignment pin 912 as the second alignment pin 912 would not be aligned with the first pin slot 904 such that the second alignment pin 912 would interfere with insertion of the first strain gauge bar 700. The first strain gauge bar 700 may instead be inserted into the puck recess 212 with the first pin slot 904 aligned with the first alignment pin 908 such that the first alignment pin 908 extends into the first pin slot 904 during insertion of the first strain gauge bar 700 into the puck recess 212. Alternatively, the pin slots 914 (e.g., the first pin slot 904 and the second pin slot 906 may be formed in the bottom surface 404 of the puck recess 212 and the alignment pins 720 may protrude from the bottom surface 404 of the strain gauge bars 304.

Further, the pin slots 914 and respective alignment pins 720 may alternatively be uniformly positioned about the puck recess 212 such that any strain gauge bar 304 (e.g., the first strain gauge bar 700, the second strain gauge bar 702, and the third strain gauge bar 900) may be aligned with any pin slot 914 and/or alignment pin 720 formed in the puck recess 212. As set forth below, the alignment pins 720 may be configured to restrain rotation of the strain gauge bars 304 within the puck recess 212. As illustrated, the puck recess 212 may include the single wedge recess 916 discussed above. The single wedge recess 426 may extend about the circumference of the bottom surface 404 of the puck recess 212 such that the first wedge feature 416 may be inserted into a first portion 918 of the single wedge recess 426 and the second wedge feature 420 of the first strain gauge bar 700 may be inserted into a second portion 920 of the single wedge recess 426 positioned on an opposite side of the puck recess 212 with respect to the first portion 918 of the single wedge recess 426. The interface between the alignment pins 720, the strain gauge bars 304, and the puck recess 212 may restrain movement of the strain gauge bars 304 around the single wedge recess 426 such that the strain gauge bars 304 are maintained in a desired orientation during drilling operations.

Accordingly, the present disclosure may provide strain puck systems and methods for removably securing strain pucks within corresponding puck recesses in downhole drilling tools for collecting and transmitting data regarding forces and the downhole drilling tools. The systems and methods may include any of the various features disclosed herein, including one or more of the following statements.

Statement 1. A system, comprising: a strain gauge bar securable within a puck recess formed in an outer surface of a downhole drill bit, wherein the strain gauge bar is configured to collect data indicating a downhole force applied to the downhole drill bit during drilling operations, the strain gauge bar having: a body portion; and at least one wedge feature protruding from the body portion, and wherein the at least one wedge feature is insertable into at least one wedge recess formed in a bottom surface of the puck recess; and a strain puck cap securable within the puck recess, wherein the strain puck cap is configured to apply pressure to the strain gauge bar to drive the at least one wedge feature of the strain gauge bar into the at least one wedge recess and pre-load the strain gauge bar.

Statement 2. The system of statement 1, wherein the at least one wedge feature comprises a first wedge feature disposed at a first end of the strain gauge bar and a second wedge feature disposed at a second end of the strain gauge bar.

Statement 3. The system of statement 1 or statement 2, wherein an end of the at least one wedge feature protrudes outward from a bottom surface of the body portion of the strain gauge bar.

Statement 4. The system of any preceding statement, wherein the at least one wedge feature comprises at least one angled wedge surface configured to interface with a corresponding angled recess surface of the at least one wedge recess.

Statement 5. The system of any preceding statement, wherein the body portion of the strain gauge bar comprises a rectangular prism shape having a first end and a second end, and wherein strain gauge bar is securable within the puck recess with the first end disposed proximate a first portion of an inner side surface of the puck recess and the second end disposed proximate a second portion of the inner side surface of the puck recess positioned opposite the first portion.

Statement 6. The system of any preceding statement, wherein the body portion of the strain gauge bar includes a groove formed in a middle portion of the body portion.

Statement 7. The system of any preceding statement, wherein the puck recess is defined by a substantially cylindrical bore formed in the outer surface of the downhole drill bit.

Statement 8. The system of any preceding statement, wherein the puck recess comprises a variable diameter along a depth of the puck recess with an upper portion of the puck recess disposed proximate the outer surface of the downhole drill bit having a greater diameter than a lower portion of the puck recess disposed proximate the bottom surface of the puck recess.

Statement 9. The system of any preceding statement, wherein the puck recess is formed in a shank of the downhole drill bit, a bit body of the downhole drill bit, or some combination thereof.

Statement 10. The system of any preceding statement, wherein an inner side surface of the puck recess has a first threading, and wherein the strain puck cap includes a second threading configured to interface with corresponding first threading of the puck recess to secure the strain puck cap in the puck recess.

Statement 11. The system of any of statements 1-9, wherein a diameter of the strain puck cap is greater than a diameter of the puck recess such that the strain puck cap is securable within the puck recess via a press fit.

Statement 12. A system, comprising: a downhole drill bit having at least one puck recess formed in an outer surface of the downhole drill bit, and wherein the at least one puck recess comprises at least one wedge recess formed in a bottom surface of the puck recess; a strain gauge bar securable within the puck recess formed in the outer surface of the downhole drill bit, wherein the strain gauge bar is configured to collect data indicating a downhole force applied to the downhole drill bit during drilling operations, the strain gauge bar having: a body portion; and at least one wedge feature protruding from the body portion, and wherein the at least one wedge feature is insertable into the at least one wedge recess formed in the bottom surface of the puck recess; and a strain puck cap securable within the puck recess, wherein the strain puck cap is configured to apply pressure to the strain gauge bar to drive the at least one wedge feature of the strain gauge bar into the at least one wedge recess and pre-load the strain gauge bar.

Statement 13. The system of statement 12, wherein the downhole drill bit comprises a bit body, a shank coupled to the bit body, and a plurality of blades disposed on the bit body, each blade having respective cutting elements disposed thereon, and wherein the puck recess is formed in the shank of the downhole drill bit.

Statement 14. The system of statement 12 or statement 13, wherein the puck recess is formed in a bit body of the downhole drill bit.

Statement 15. The system of any of statements 12-14, wherein the body portion includes a first end portion, a second end portion, and a middle portion positioned between the first end portion and the second end portion, and wherein the middle portion has a smaller cross-sectional area than the first end portion and the second end portion.

Statement 16. A system, comprising: a downhole drill bit having at least one puck recess formed in an outer surface of the downhole drill bit; a first strain gauge bar having a first body portion and at least one first wedge feature protruding from the first body portion, wherein the at least one first wedge feature is disposed in at least one first wedge recess formed in a bottom surface of the at least one puck recess; a second strain gauge bar having a second body portion and at least one second wedge feature protruding from the second body portion, wherein the at least one second wedge feature is disposed at least one second wedge recess formed in the bottom surface of the at least one puck recess, and wherein the first and second strain gauge bars are secured within the at least one puck recess formed in the outer surface of the downhole drill bit, wherein the first strain gauge bar is angularly offset from the second strain gauge bar in the puck recess, and wherein the first and second strain gauge bars are configured to collect data indicating at least one downhole force applied to the downhole drill bit during drilling operations; and a strain puck cap securable within the at least one puck recess, wherein the strain puck cap is configured to apply pressure to the first strain gauge bar and the second strain gauge bar to drive the at least one first wedge feature and the at least one second wedge feature into the at least one first wedge recess and the at least one second wedge recess, respectively, and pre-load the first strain gauge bar and the second strain gauge bar.

Statement 17. The system of statement 16, wherein the first strain gauge bar is angularly offset from the second strain gauge bar in the puck recess by an angle between thirty degrees and one-hundred and fifty degrees.

Statement 18. The system of statement 16 or statement 17, further comprising a plurality of alignment pins configured to receive the first strain gauge bar and the second strain gauge bar at pre-determined orientations in the puck recess.

Statement 19. The system of any of statements 16-18, wherein the at least one first wedge feature and the at least one second wedge feature each have keyed geometries corresponding to the at least one first wedge recess and the at least one second wedge feature, respectively.

Statement 20. The system of any of statements 16-19, wherein the first strain gauge bar and the second strain gauge bar are axially offset from each other in the puck recess.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A system, comprising:

a strain gauge bar securable within a puck recess formed in an outer surface of a downhole drill bit, wherein the strain gauge bar is configured to collect data indicating a downhole force applied to the downhole drill bit during drilling operations, the strain gauge bar having:

a body portion; and at least one wedge feature protruding from the body portion, and wherein the at least one wedge feature is insertable into at least one wedge recess formed in a bottom surface of the puck recess; and a strain puck cap securable within the puck recess, wherein the strain puck cap is configured to apply pressure to the strain gauge bar to drive the at least one wedge feature of the strain gauge bar into the at least one wedge recess and pre-load the strain gauge bar.

2. The system of claim 1, wherein the at least one wedge feature comprises a first wedge feature disposed at a first end of the strain gauge bar and a second wedge feature disposed at a second end of the strain gauge bar.

3. The system of claim 1, wherein an end of the at least one wedge feature protrudes outward from a bottom surface of the body portion of the strain gauge bar.

4. The system of claim 1, wherein the at least one wedge feature comprises at least one angled wedge surface configured to interface with a corresponding angled recess surface of the at least one wedge recess.

5. The system of claim 1, wherein the body portion of the strain gauge bar comprises a rectangular prism shape having a first end and a second end, and wherein strain gauge bar is securable within the puck recess with the first end disposed proximate a first portion of an inner side surface of the puck recess and the second end disposed proximate a second portion of the inner side surface of the puck recess positioned opposite the first portion.

6. The system of claim 1, wherein the body portion of the strain gauge bar includes a groove formed in a middle portion of the body portion.

7. The system of claim 1, wherein the puck recess is defined by a substantially cylindrical bore formed in the outer surface of the downhole drill bit.

8. The system of claim 1, wherein the puck recess comprises a variable diameter along a depth of the puck recess with an upper portion of the puck recess disposed proximate the outer surface of the downhole drill bit having a greater diameter than a lower portion of the puck recess disposed proximate the bottom surface of the puck recess.

9. The system of claim 1, wherein the puck recess is formed in a shank of the downhole drill bit, a bit body of the downhole drill bit, or some combination thereof.

10. The system of claim 1, wherein an inner side surface of the puck recess has a first threading, and wherein the strain puck cap includes a second threading configured to interface with corresponding first threading of the puck recess to secure the strain puck cap in the puck recess.

11. The system of claim 1, wherein a diameter of the strain puck cap is greater than a diameter of the puck recess such that the strain puck cap is securable within the puck recess via a press fit.

12. A system, comprising:

a downhole drill bit having at least one puck recess formed in an outer surface of the downhole drill bit, and wherein the at least one puck recess comprises at least one wedge recess formed in a bottom surface of the puck recess;

a strain gauge bar securable within the puck recess formed in the outer surface of the downhole drill bit, wherein the strain gauge bar is configured to collect data indicating a downhole force applied to the downhole drill bit during drilling operations, the strain gauge bar having:

a body portion; and at least one wedge feature protruding from the body portion, and wherein the at least one wedge feature is insertable into the at least one wedge recess formed in the bottom surface of the puck recess; and a strain puck cap securable within the puck recess, wherein the strain puck cap is configured to apply pressure to the strain gauge bar to drive the at least one wedge feature of the strain gauge bar into the at least one wedge recess and pre-load the strain gauge bar.

13. The system of claim 12, wherein the downhole drill bit comprises a bit body, a shank coupled to the bit body, and a plurality of blades disposed on the bit body, each blade having respective cutting elements disposed thereon, and wherein the puck recess is formed in the shank of the downhole drill bit.

14. The system of claim 12, wherein the puck recess is formed in a bit body of the downhole drill bit.

15. The system of claim 12, wherein the body portion includes a first end portion, a second end portion, and a middle portion positioned between the first end portion and the second end portion, and wherein the middle portion has a smaller cross-sectional area than the first end portion and the second end portion.

16. A system, comprising:

a downhole drill bit having at least one puck recess formed in an outer surface of the downhole drill bit;

a first strain gauge bar having a first body portion and at least one first wedge feature protruding from the first body portion, wherein the at least one first wedge feature is disposed in at least one first wedge recess formed in a bottom surface of the at least one puck recess;

a second strain gauge bar having a second body portion and at least one second wedge feature protruding from the second body portion, wherein the at least one second wedge feature is disposed at least one second wedge recess formed in the bottom surface of the at least one puck recess, and wherein the first and second strain gauge bars are secured within the at least one puck recess formed in the outer surface of the downhole drill bit, wherein the first strain gauge bar is angularly offset from the second strain gauge bar in the puck recess, and wherein the first and second strain gauge bars are configured to collect data indicating at least one downhole force applied to the downhole drill bit during drilling operations; and a strain puck cap securable within the at least one puck recess, wherein the strain puck cap is configured to apply pressure to the first strain gauge bar and the second strain gauge bar to drive the at least one first wedge feature and the at least one second wedge feature into the at least one first wedge recess and the at least one second wedge recess, respectively, and pre-load the first strain gauge bar and the second strain gauge bar.

17. The system of claim 16, wherein the first strain gauge bar is angularly offset from the second strain gauge bar in the puck recess by an angle between thirty degrees and one-hundred and fifty degrees.

18. The system of claim 16, further comprising a plurality of alignment pins configured to receive the first strain gauge bar and the second strain gauge bar at pre-determined orientations in the puck recess.

19. The system of claim 16, wherein the at least one first wedge feature and the at least one second wedge feature each have keyed geometries corresponding to the at least one first wedge recess and the at least one second wedge feature, respectively.

20. The system of claim 16, wherein the first strain gauge bar and the second strain gauge bar are axially offset from each other in the puck recess.

* * * * *